(12) United States Patent
Aggarwal et al.

(10) Patent No.: US 6,883,776 B2
(45) Date of Patent: Apr. 26, 2005

(54) SLIT VALVE FOR A SEMICONDUCTOR PROCESSING SYSTEM

(75) Inventors: Ravinder Aggarwal, Gilbert, AZ (US); Jim Kusbel, Fountain Hills, AZ (US); Jerry Davis, Phoenix, AZ (US)

(73) Assignee: ASM America, Inc., Phoenix, AZ (US)

( * ) Notice: Subject to any disclaimer, the term of this patent is extended or adjusted under 35 U.S.C. 154(b) by 141 days.

(21) Appl. No.: 10/225,546

(22) Filed: Aug. 20, 2002

(65) Prior Publication Data

US 2004/0036053 A1 Feb. 26, 2004

(51) Int. Cl.[7] ................................................ F16K 31/44
(52) U.S. Cl. ........................................ 251/83; 251/330
(58) Field of Search .......................... 251/83, 82, 330, 251/329, 326

(56) References Cited

U.S. PATENT DOCUMENTS

| | | | |
|---|---|---|---|
| 156,877 A | * 11/1874 | Chinnock | 251/330 |
| 2,583,291 A | * 1/1952 | Beem | 251/330 |
| 2,913,012 A | * 11/1959 | McCurley | 251/330 |
| 2,924,232 A | * 2/1960 | Michaels | 251/330 |
| 3,316,929 A | * 5/1967 | Milette | 251/329 |
| 3,831,900 A | * 8/1974 | Matousek et al. | 251/330 |
| 4,052,036 A | 10/1977 | Schertler | |
| 4,714,237 A | * 12/1987 | Linderman et al. | 251/330 |
| 4,921,213 A | 5/1990 | Geiser | |
| 4,991,619 A | * 2/1991 | della Porta | 251/330 |
| 5,226,632 A | 7/1993 | Tepman et al. | |
| 5,379,983 A | 1/1995 | Geiser | |
| 5,563,798 A | 10/1996 | Berken et al. | |
| 5,577,707 A | 11/1996 | Brida | |
| 5,579,718 A | 12/1996 | Freerks | |
| 5,879,461 A | 3/1999 | Adams | |
| 5,980,194 A | 11/1999 | Freerks et al. | |
| 6,192,827 B1 | 2/2001 | Welch et al. | |
| 6,246,923 B1 | 6/2001 | Sugimura et al. | |
| 6,291,814 B1 | 9/2001 | Chuang et al. | |
| 6,315,512 B1 | 11/2001 | Tabrizi et al. | |
| 6,367,770 B1 | 4/2002 | Duelli | |
| 6,413,356 B1 | 7/2002 | Chokshi et al. | |
| 6,430,468 B1 | 8/2002 | Tepman et al. | |
| 6,499,367 B1 | 12/2002 | Saeki | |
| 6,553,280 B2 | 4/2003 | Johnson et al. | |
| 6,719,272 B1 | * 4/2004 | Iwata | 251/330 |

FOREIGN PATENT DOCUMENTS

| | | |
|---|---|---|
| JP | 411288892 A | 10/1999 |
| WO | WO 00/75544 A1 * | 6/2000 |

* cited by examiner

*Primary Examiner*—John Bastianelli
(74) *Attorney, Agent, or Firm*—Knobbe, Martens, Olson & Bear, LLP

(57) ABSTRACT

A slit valve for a semiconductor processing apparatus, for fluidly sealing a passage connecting two chambers of the apparatus, such as a substrate reaction chamber and a region outside the reaction chamber. The slit valve comprises an actuator plate movable within a slot in one wall of the passage, the actuator plate and the slot oriented generally transverse to the passage. The actuator plate has a first position in which the valve is open, permitting the transfer of a substrate through the passage. The actuator plate also has a second position in which the valve is closed, and in which the actuator plate fluidly seals the passage such that fluid cannot flow through the passage across the actuator plate. A protective cover is configured to prevent debris within the passage (e.g., broken wafers, shards, particulate contaminants, etc.) from flowing into the slot when the actuator plate occupies its second position. In one embodiment, the cover is pivotably secured to the first wall of the passage, proximate the slot. In another embodiment, the cover is secured to the actuator plate, proximate an end thereof. In a preferred embodiment, the cover comprises a plate.

54 Claims, 5 Drawing Sheets

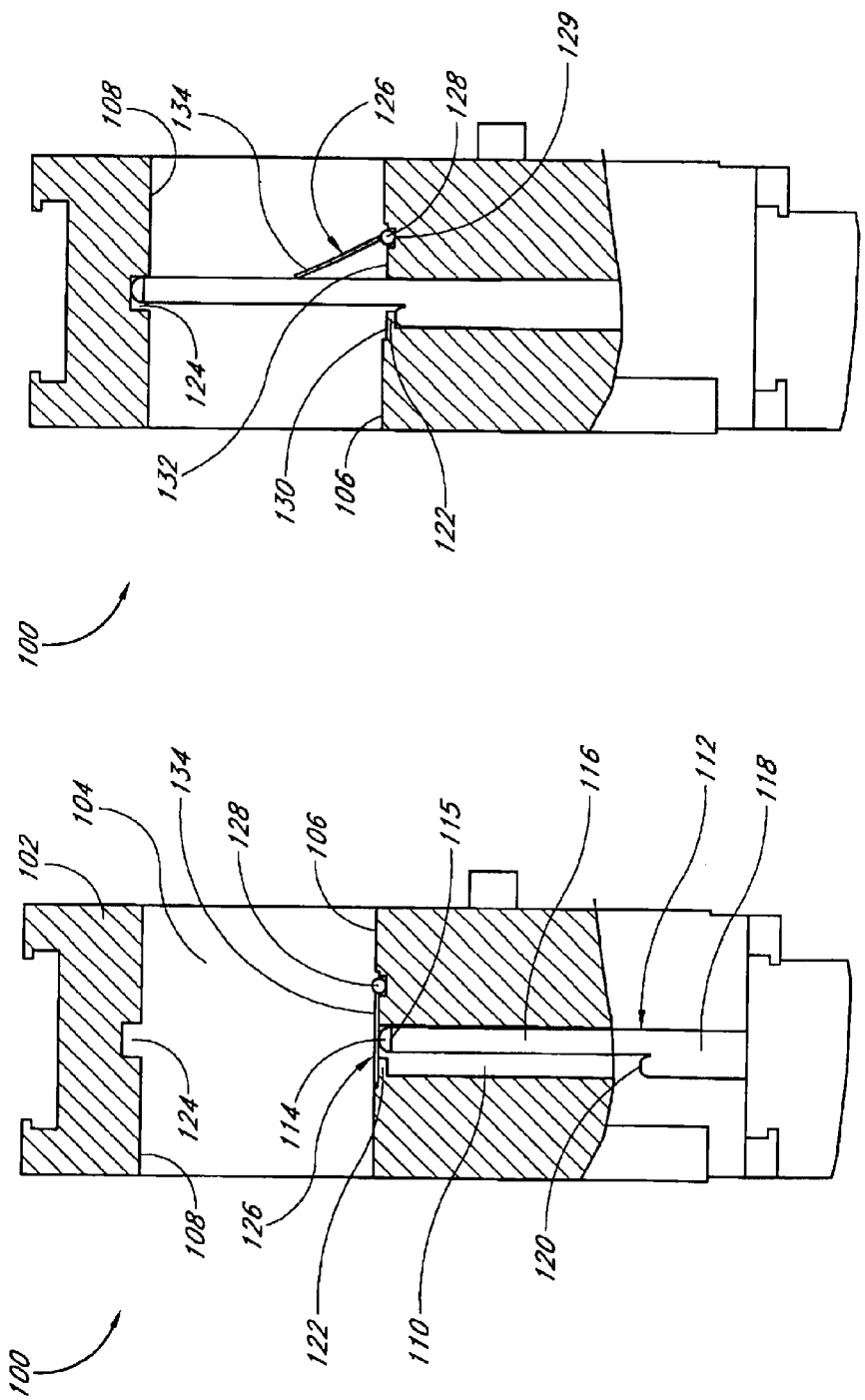

SLIT VALVE FOR A SEMICONDUCTOR PROCESSING SYSTEM

FIELD OF THE INVENTION

The present invention relates generally to processing equipment for semiconductor substrates and specifically to a slit-type gate valve through which such substrates are passed.

BACKGROUND AND SUMMARY OF THE INVENTION

High-temperature ovens, or reactors, are used to process semiconductor substrates from which integrated circuits are made for the electronics industry. A substrate, typically a circular silicon wafer, is placed inside a reaction chamber within the reactor. Typically, the wafer is supported upon a wafer holder enclosed within a reaction chamber, and the wafer and wafer holder are heated to high temperatures. In one exemplary process, a reactant gas is passed over the heated wafer, causing the chemical vapor deposition (CVD) of a thin layer of the reactant material on the wafer. Through a variety of deposition, etching, photolithography, doping, annealing, and other processes in other equipment, such layers are made into integrated circuits, producing from hundreds to millions of integrated devices, depending on the size of the wafer and the complexity of the circuits.

One factor affecting the quality of a processed wafer is the number of contaminant particles on the wafer, which depends upon the degree of particulate contamination within the semiconductor processing equipment, and particularly the reaction chamber. In order to reduce contamination, it is important to effectively seal the various chambers inside the processing equipment from the outer environment and in some cases from each other during processing. In some reactors, a slit-type gate valve, or "slit valve," is utilized to seal the reaction chamber from the environment. In this Background and Summary of the Invention, such valves are discussed in the context of sealing the reaction chamber from other chambers of the semiconductor processing equipment. However, it will be understood that such valves can be used in a variety of different locations, such as, for example, between load-lock chambers and wafer transfer chambers.

In one common configuration, the slit valve resides within a passage connected to the reaction chamber, the passage sized and adapted for the transfer of semiconductor wafers into and from the chamber. The slit valve commonly includes a valve housing that defines a portion of the aforementioned passage. The valve includes an actuator plate positioned within a slot in the valve housing, the actuator plate being moveable within the slot in a direction generally transverse to the passage. In an open position of the slit valve, the actuator plate is positioned to permit the transfer of semiconductor wafers into and from the reaction chamber through the passage. In a closed position of the slit valve, the actuator plate is positioned to fluidly seal (i.e., to seal such that fluids cannot pass through) the passage, in order to isolate and limit particulate contamination of the reaction chamber. In the closed position of the slit valve, the actuator plate prevents fluid from flowing through the passage across the actuator plate. Typically, the actuator plate includes a compliant sealing material that seals against a sealing surface on the inner surface of the valve housing. In a typical cycle of use, the slit valve is first opened to permit the removal of a processed wafer from the reaction chamber. The processed wafer is removed through the passage, and a new substrate is inserted into the reaction chamber for processing. The slit valve is then closed.

One problem associated with conventional slit valves for semiconductor reactors is that debris within the passage, such as broken wafer fragments, shards, and particulate contaminants, tend to enter the slot within which the actuator plate is received. This often occurs when the valve is open, as wafers and equipment used for transferring the wafers, such as, for example, spatulas or Bernoulli wands, move through the passage. Such debris can even include particles that flake off of the wafers or even the wafer transfer equipment. The debris can eventually build up in the slot, leading to the generation of particles as the actuator plate grinds against the debris. This causes particle counts to rise to undesirable levels. Also, the debris that builds up within the slot can damage the sealing material on the actuator plate, leading to a reduction in sealing effectiveness. Particles on the edges of the actuator plate can additionally damage (e.g., scratch) the sealing surface on the inner surface of the passage/valve housing, also leading to reduced sealing effectiveness.

Thus, it is a principle object and advantage of the present invention to overcome the above-described problems associated with slit valves for semiconductor processing apparatus.

In one aspect, the present invention provides a slit valve comprising a passage, an actuator plate, and a protective cover. The passage is sized and adapted for the transfer of a semiconductor substrate through the passage. The passage has first and second walls generally opposing one another. The first wall has a slot oriented generally transverse to the passage. The actuator plate is received within and configured to translate within the slot. The actuator plate has a first position in which it permits the transfer of a substrate through the passage, and a second position in which it blocks the passage. The protective cover is configured to substantially prevent debris within the passage from entering the slot when the actuator plate occupies its first position.

In another aspect, the present invention provides a semiconductor processing apparatus that includes a slit valve comprising a passage and an actuator plate. The passage has first and second walls generally opposing one another, the first wall having a slot. The actuator plate is received within and configured to translate within the slot. The actuator plate has a first position in which it permits transfer of a substrate through the passage, and a second position in which it blocks the passage. The plate is configured to selectively cover the slot when the actuator plate occupies its first position.

In another aspect, the present invention provides an apparatus for processing a semiconductor substrate. The apparatus comprises a first chamber, a second chamber, a passage connecting the first and second chambers, an actuator plate, and a protective cover. The passage is sized and adapted to permit the transfer of a substrate between the first and second chambers. The passage has first and second walls generally opposing one another, the first wall having a slot. The actuator plate is received within and configured to translate within the slot. The actuator plate has a first position in which it permits the transfer of a substrate from the first chamber through the passage into the second chamber. The actuator plate also has a second position in which it blocks the passage. The protective cover is hingedly secured to the first wall of the passage proximate the slot. The cover has a closed position in which it substantially prevents debris within the passage from entering the slot. The cover is permitted to occupy its closed position when the actuator plate occupies its first position. The cover has an open position, which it occupies when the actuator plate occupies its second position.

In another aspect, the present invention provides an apparatus for processing a semiconductor substrate, comprising a chamber configured to enclose a semiconductor substrate, a region outside the chamber, a passage connecting said chamber and said region, an actuator plate, and a protective cover. The passage is sized and configured for transferring a substrate through the passage between said chamber and said region. The passage has first and second walls generally opposing one another, the first wall having a slot oriented generally transverse to the passage. The actuator plate is received within and translatable within the slot in the first wall. The actuator plate has a first position in which it permits the transfer of a substrate from said region through the passage into said chamber. The actuator plate also has a second position in which it blocks the passage. The protective cover is secured to the actuator plate proximate an end of the actuator plate. The cover is configured to substantially prevent debris within the passage from entering the slot when the actuator plate occupies its first position.

In yet another aspect, the present invention provides a method of transferring a substrate from a region outside a chamber of a semiconductor processing system to within the chamber, wherein the processing system includes a passage connecting said region and the chamber. According to the method, an actuator plate is provided in a position sealing the passage. The actuator plate is withdrawn into a slot extending from walls of the passage, thereby opening the passage. When the actuator plate is withdrawn into the slot, a protective cover is positioned over the slot. When the actuator plate is withdrawn into the slot, a substrate is transferred from said region through the passage into the chamber.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 5 is a schematic side view of one embodiment of a slit valve according to the present invention, shown in an open position;

FIG. 6 is a schematic side view of the slit valve of FIG. 5, shown in a closed position;

DETAILED DESCRIPTION OF THE PREFERRED EMBODIMENT

Figure 1:
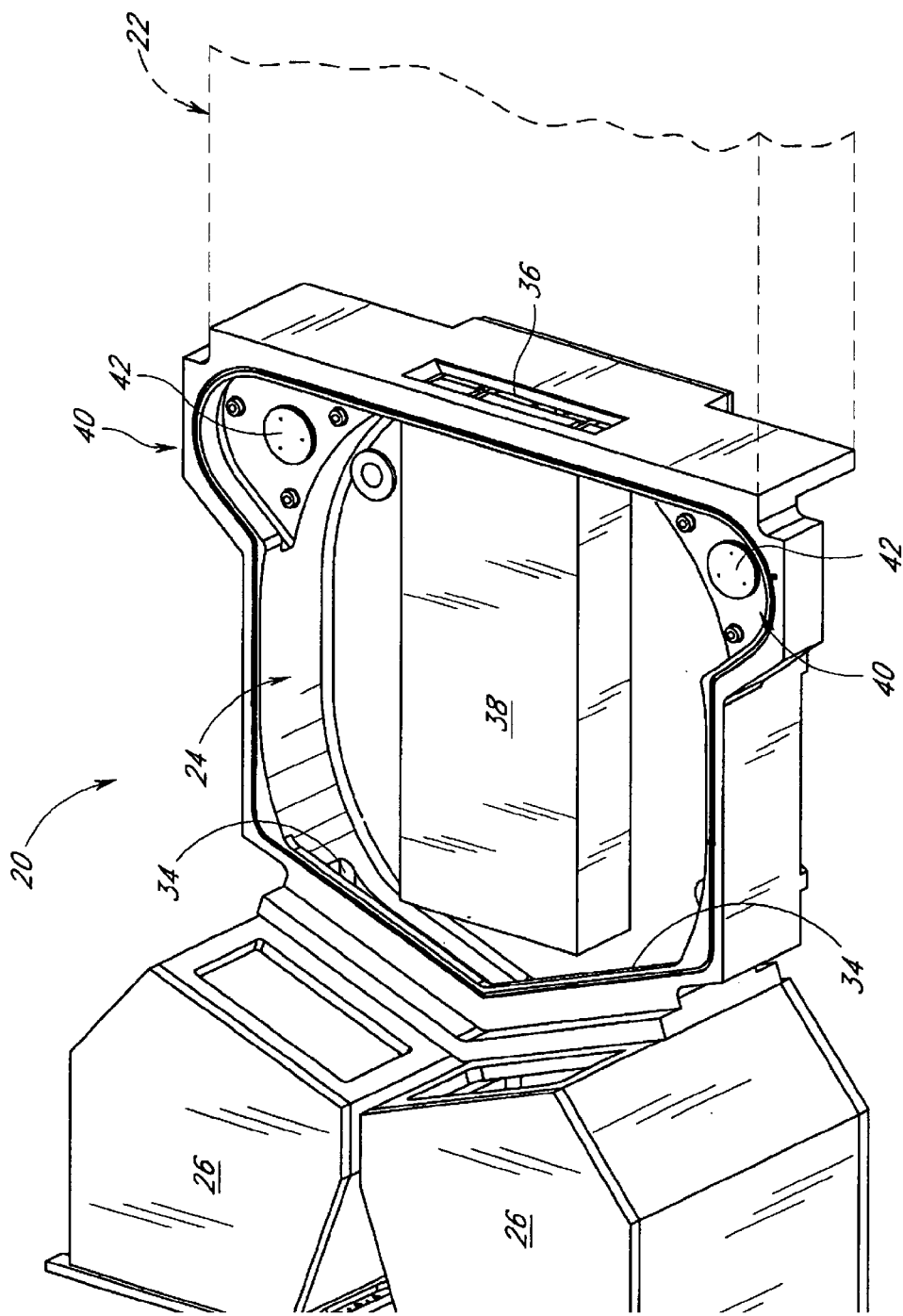
FIG. 1 is a schematic, partially cut-away, perspective view of a semiconductor reactor, including two wafer load/unload chambers, a wafer-handling chamber, and a substrate reaction chamber, as known in the art.
Figure 2:
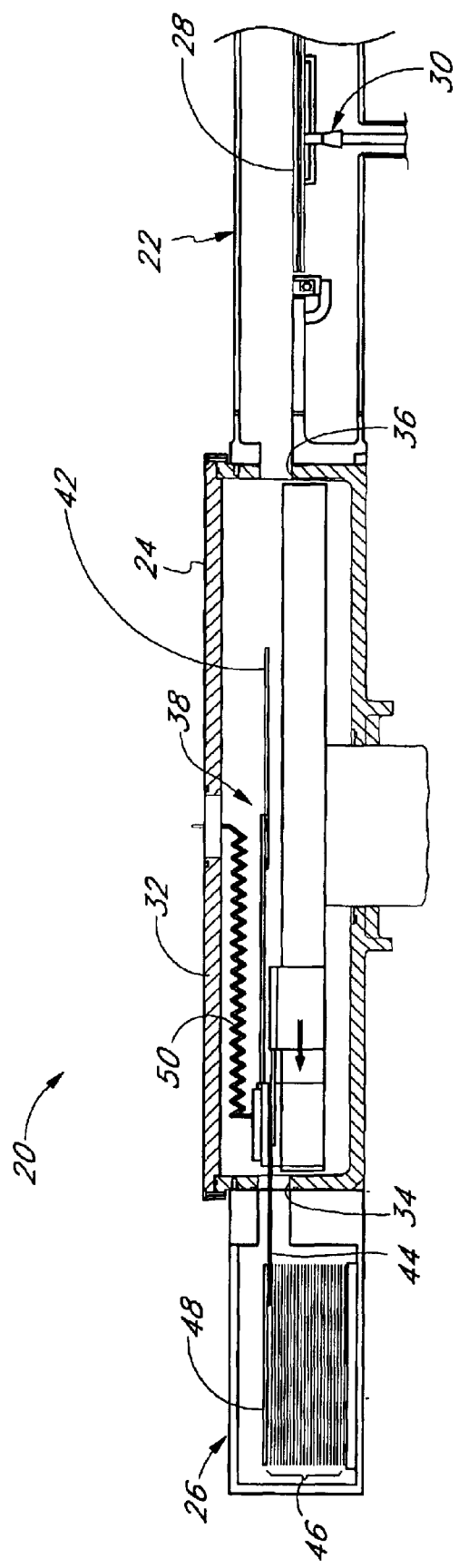
FIG. 2 is a schematic side view of the reactor of FIG. 1.

Prior to describing the details of the slit valves of the present invention, it will be instructive to discuss an overall configuration of a semiconductor processing system, in order to provide one exemplary context for the use of slit valves. FIGS. 1 and 2 illustrate an exemplary semiconductor reactor 20 within which slit valves can be used. While the valves of the present invention are discussed in the context of a semiconductor reactor, it will be appreciated that these valves can be utilized in any of a variety of other environments in which it is desired to fluidly seal two adjacent regions from one another. Also, the skilled artisan will appreciate that the valves of the present invention can be utilized in a variety of different locations within a semiconductor processing apparatus.

FIGS. 1 and 2 illustrate a single wafer semiconductor reactor 20 that utilizes slit valves to fluidly seal various chambers. The illustrated reactor 20 includes a substrate reaction chamber 22, a wafer-handling chamber 24, and two wafer load/unload chambers 26. In FIG. 1, only partial contours of the reaction chamber 22 are shown, which are indicated by broken lines. Referring to FIG. 2, the reaction chamber 22 includes a wafer holder 28 for supporting a wafer during processing, and a support spider 30 that supports the wafer holder 28. If the wafer holder 28 is formed of a material that absorbs radiant heat (e.g., graphite), it is often referred to as a susceptor.

In FIG. 1, the upper wall 32 (FIG. 2) of the wafer-handling chamber 24 is not shown, in order to illustrate internal components. The illustrated chamber 24 is of a type described in U.S. Pat. No. 6,073,366 to Aswad, and includes two wafer-cooling stations 40 for cooling wafers after processing. Each cooling station 40 is sized to receive one wafer in a horizontal position. Each cooling station 40 comprises a lower showerhead assembly 42 and an upper showerhead assembly (not shown), for emitting cooling gas onto top and bottom surfaces of the wafers. Wafers are transferred between the handling chamber 24 and the wafer load/unload chambers 26 by way of load/unload ports 34. A processing port 36 is provided for transferring wafers between the handling chamber 24 and the reaction chamber 22.

Referring to FIG. 1, in one known configuration the two wafer load/unload chambers 26 comprise one chamber for loading and a separate chamber for unloading. Either may be referred to as a storage area. Of course, if desired, each chamber 26 can serve both the loading and unloading function. In fact, many systems utilize a single load/unload chamber from which a wafer is withdrawn for processing and is then returned after processing. FIG. 2 schematically shows a single one of the chambers 26. Slit valves are often provided for sealing the load/unload ports 34 and the processing port 36.

With reference to FIG. 1, the illustrated wafer-handling chamber 24 includes a wafer handler 38 (shown schematically by a box) configured to transfer wafers between the reaction chamber 22, load/unload chambers 26, and cooling stations 40. Any of a variety of known systems for handling wafers within semiconductor processing systems can be used within the illustrated reactor 20. One type of pick-up device is known as a Bernoulli wand, which utilizes jets of gas emitted downward from the wand toward the wafer. The gas flows radially outward to create a region of lower pressure between the wafer and the wand, thereby lifting the wafer. The Bernoulli wand advantageously avoids contact with the wafer. One type of Bernoulli wand is shown in U.S. Pat. No. 5,080,549 to Goodwin et al. Another type of wafer pick-up wand utilizes a vacuum force and, thus, must be in intimate contact with the wafer. U.S. Pat. No. 4,566,726 to Corentti et al. discusses a combination of Bernoulli and vacuum pick-up devices. Yet another type of wafer pick-up device is a simple paddle that lifts and support wafers from underneath. Such a paddle is illustrated in U.S. Pat. No. 4,951,601 to Maydan et al. That patent also illustrates a typical movement device for translating wafers from location to location within a processing system. The Maydan wafer handler is capable of linear retraction and extension, as well as rotation about an axis.

In one embodiment, shown in FIG. 2, the wafer handler 38 comprises both a Bernoulli wand 42 and a paddle 44. A complete description of such an arrangement is disclosed in U.S. Pat. No. 6,183,183. A hose 50 is provided for providing gas flow to the Bernoulli wand 42. Each wafer load/unload chamber 26 is adapted to store a cartridge 46 of wafers 48. The handler 38 is adapted to pick up an unprocessed wafer from one of the load/unload chambers 26, transfer the wafer to the wafer holder 28 of the reaction chamber 22, pick-up the wafer from the wafer holder 28 after processing, and transfer the processed wafer to one of the chambers 26. The handler 38 may also be configured to transfer the processed wafer to one of the cooling stations 40 for cooling prior to transferring the processed wafer to the storage chamber 26. The Bernoulli wand 42 is preferably utilized for transferring wafers into and out of the reaction chamber 22, while the paddle 44 is preferably utilized for transferring wafers to and from the cartridges 46 of the load/unload chambers 26.

Figure 4:
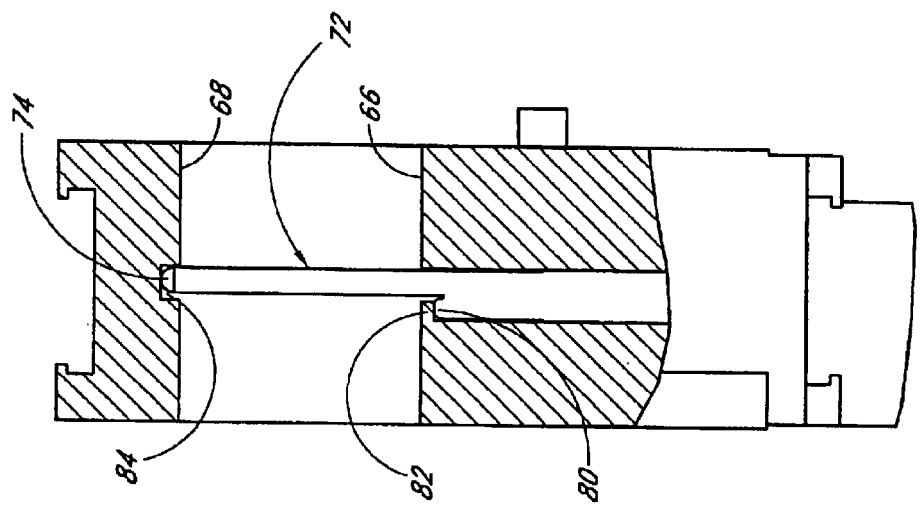
FIG. 4 is a schematic side view of the prior art slit valve of FIG. 3, shown in a closed position.
Figure 3:
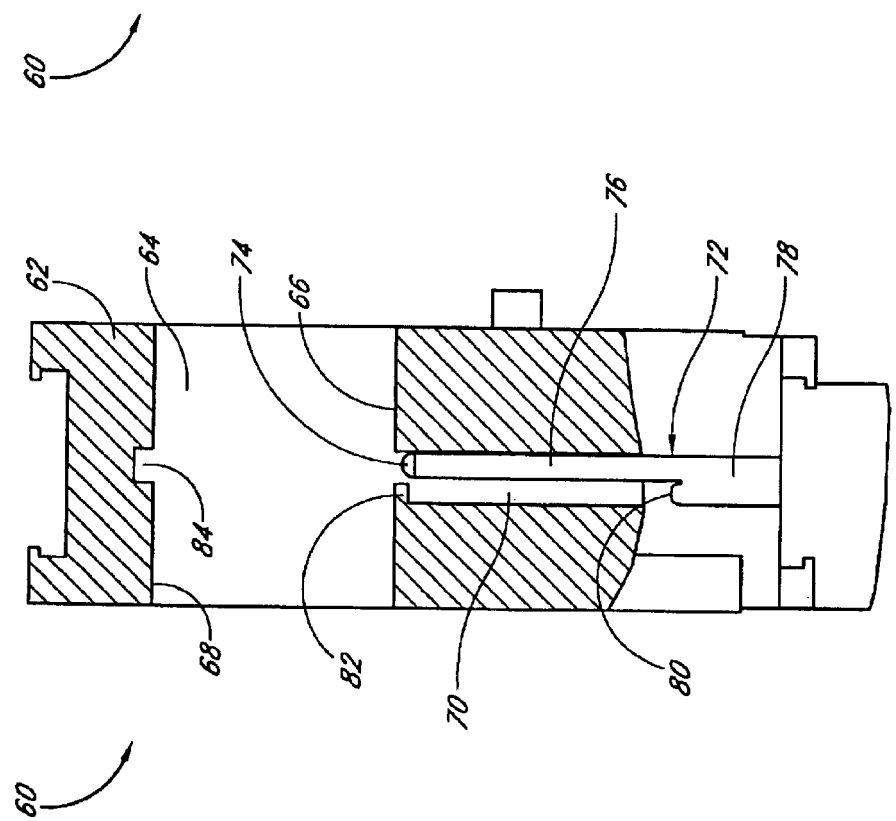
FIG. 3 is a schematic side view of a prior art slit valve for a semiconductor reactor, shown in an open position.

FIGS. 3 and 4 illustrate a prior art slit valve 60 that can be utilized within one or more of the wafer transfer ports of a semiconductor processing apparatus, such as within the load/unload ports 34 and the processing port 36 of the reactor 20 illustrated in FIGS. 1 and 2. The slit valve 60 can be purchased from VAT, Inc., of Switzerland. The valve 60 operates to block and/or fluidly seal the wafer transfer port, and to thereby fluidly seal from one another the chambers connected by the port. As used herein, to "fluidly seal" means to seal a first region from a second region in a manner such that fluids cannot pass through the seal between the first and second regions. The illustrated prior art valve 60 comprises a valve housing 62 configured to fit within the main body of the reactor housing, so that a passage 64 of the valve housing 62 is aligned with or forms a portion or the entirety of the wafer transfer port. The passage 64 includes a floor 66 and a ceiling 68. The floor 66 includes a slot 70 oriented perpendicular to the passage 64, floor 66, and ceiling 68. The slot 70 houses a vertically movable actuator plate 72. Also provided is a means for moving the plate, such as a pneumatic rack-and-pinion mechanical actuator. A compliant sealing material 74 is attached to a sealing edge of the actuator plate 72. The illustrated plate 72 comprises an upper, relatively thinner portion 76 and a lower, relatively thicker portion 78, separated by a step 80. The floor 66 includes a ledge 82 partially covering the slot 70 and positioned above the step 80 of the plate 72. The ceiling 68 includes a groove 84 sized and configured to receive the upper edge of the plate 72, including the sealing material 74.

In FIG. 3, the valve 60 is shown in an open position, wherein the actuator plate 72 is lowered. In FIG. 4, the valve 60 is shown in a closed position, wherein the actuator plate 72 is raised to at least block, and possibly fluidly seal, the passage 64. When the actuator plate 72 is in its raised position, the step 80 and the ledge 82 cooperate to help seal the passage 64 at the floor 66. In the raised position of the actuator plate 72, the upper edge of the plate 72 is received within the groove 84.

As explained above in the Background and Summary section, the illustrated prior art valve 60 construction does not prevent the flow of debris into the slot 70 when the actuator plate 72 is lowered. As a result, debris (e.g., broken wafers, shards, particles) tends to build up in regions of the reactor that are difficult to clean, undesirably increasing particle counts. In addition, debris can fall onto and possibly damage the sealing material 74, which can result in a reduction in sealing effectiveness. Such debris on the sealing material 74 can also scratch the upper surface of the groove 84 when the plate 72 is raised, which can also reduce sealing effectiveness.

FIGS. 5 and 6 illustrate a gate or slit valve 100 configured in accordance with a preferred embodiment of the present invention. The valve 100 can be utilized within one or more of the wafer transfer ports of a semiconductor processing apparatus, such as within the load/unload ports 34 and the processing port 36 of the reactor 20 illustrated in FIGS. 1 and 2. The valve 100 operates to block and preferably fluidly seal the wafer transfer port, and to thereby fluidly seal the chambers connected by the port. The illustrated valve 100 comprises a valve housing 102 configured to fit within the main body of the reactor housing, so that a passage 104 of the valve housing 102 is aligned with or forms a portion or the entirety of the wafer transfer port. The passage 104 includes a first wall 106 and a second wall 108 (a floor and a ceiling, respectively, in the illustrated embodiment), which generally oppose one another. In the illustrated embodiment, the walls 106 and 108 are generally parallel to one another. However, the walls 106 and 108 can be non-parallel. The passage 104 is sized and adapted for the transfer of a semiconductor substrate, along with associated substrate transfer apparatus, through the passage. The first wall 106 includes a slot 110 oriented generally transverse to the passage 104. In the illustrated embodiment, the slot 110 is perpendicular to the passage 104. However, the skilled artisan will understand that the slot 110 can be oriented non-perpendicular to the passage 104. In a typical embodiment, the walls 106 and 108 are generally horizontal, and the slot 110 and actuator plate 112 are generally vertical.

An actuator plate 112 is received within and configured to translate within the slot 110. A means for moving the plate 112 is also provided, as known in the art. The skilled artisan will understand that any of a variety of suitable mechanical actuators can be provided for moving the plate 112 between its first and second positions (as described below). In a preferred configuration, a pneumatic rack-and-pinion actuator (not shown) is provided for effecting movement of the plate 112 between its first and second positions, as well known in the art. The illustrated plate 112 comprises a relatively thinner portion 116 and a relatively thicker portion 118, separated by a step 120. A compliant sealing material 114 is attached to a sealing edge 115 of the plate 112. In a preferred embodiment, the sealing material 114 comprises VITON™, a well known polymer. The sealing edge 115 can comprise only one linear edge of the plate 112 (e.g., the upper edge in FIGS. 5 and 6). Alternatively, the sealing edge 115 can also include additional edges of the plate (e.g., the side edges of the plate 112, which extend generally parallel to the plane of FIGS. 5 and 6). The first wall 106 of the passage 104 preferably includes a ledge 122 partially covering the slot 110 and positioned above the step 120 of the plate 112. The second wall 108 preferably includes a groove 124 sized and configured to receive an edge of the plate 112, including a portion or the entirety of the sealing edge 115 and the sealing material 114.

The actuator plate 112 has a first position (in the illustrated embodiment a lowered position), shown in FIG. 5, in which the plate 112 generally does not obstruct flow through the passage 104. In its first position, the plate 112 permits the transfer of a semiconductor substrate through the passage 104. This corresponds to an open position of the valve 100. The plate 112 also has a second position (in the illustrated embodiment a raised position), shown in FIG. 6, in which the plate 112 at least blocks, and preferably fluidly seals, the flow of fluid through the passage 104 across the plate 112. In other words, the plate 112 preferably fluidly seals shut the passage 104. This corresponds to a closed position of the valve 100. When the actuator plate 112 is in its second position, the step 120 and the ledge 122 preferably cooperate to help seal the passage at the first wall 106. When the actuator plate 112 occupies its second position (e.g., FIG. 6), the sealing edge 115 preferably bears against the walls of the passage 104 to fluidly seal the passage, such that fluid cannot flow through the passage across the plate 112. In the illustrated embodiment, in the second position of the plate 112, the sealing edge 115 is preferably received within the groove 124.

A protective cover 126 is configured to prevent debris within the passage 104 (e.g., broken wafers, shards, particulate contaminants, etc.) from entering the slot 110 when the actuator plate 112 occupies its first position (e.g., FIG. 5). In the illustrated embodiment, the cover 126 comprises a plate having an edge that is pivotably or hingedly secured at a hinge 128 to the first wall 106 proximate the slot 110. The skilled artisan will understand that the cover 126 can alternatively have other (non-plate) configurations. The cover 126 has a closed position in which it substantially prevents debris within the passage 104 from entering the slot 110. Preferably, when the cover 126 occupies its closed position, it completely covers the slot 110, as shown in FIG. 5. Preferably, the valve 100 is configured such that the cover 126 is able to occupy its closed position when (in some embodiments, only when) the actuator plate 112 occupies its first position (e.g., FIG. 5). The cover 126 also has an open position, shown in FIG. 6, which it occupies when the actuator plate 112 occupies its second position (e.g., FIG. 6). Preferably, the cover 126 cannot occupy its closed position when the actuator plate 112 occupies its second position. The cover 126 is preferably configured such that movement of the actuator plate 112 from its first position to its second position forces the cover 126 to move to its open position (e.g., FIG. 6). The cover 126 is preferably biased toward its closed position, such as by a coil spring, leaf spring, or other biasing means.

Preferably, when the actuator plate 112 occupies its first position, the sealing edge 115 of the plate 112 is completely outside of the passage 104, as shown in FIG. 5. This permits the cover 126 in its closed position to be generally coplanar with or to reside flush against the first wall 106 of the passage 104. This reduces the possibility of the cover 126 obstructing the movement of wafer transfer equipment and wafers through the passage 104. This configuration also better prevents the flow of contaminants into the slot 110. Preferably, the first wall 106 includes a recess configured to receive the cover 126 in its closed position, such that a surface 134 of the cover in its closed position is substantially coplanar with the first wall 106. With reference to FIG. 6, in the illustrated embodiment this recess includes a first recess portion 130 and a second recess portion 132. The first recess portion 130 is generally above the ledge 122 and extends to the slot 110. The second recess portion 132 extends from the other side of the slot 110 to the hinge 128 of the cover 126. There may also be provided a recess 129 for the hinge 128. The recess 129 may have a different (e.g., greater) depth than the recess portions 130 and 132.

The skilled artisan will appreciate that the cover 126 can have a variety of different configurations. For example, the cover 126 could comprise two plates, each having an edge pivotably secured to the first wall 106 on opposite sides of the slot 110, such that the two plates hingedly open and close together like a pair of double doors. Alternatively, the cover 126 could comprise a single plate configured to slide along the first wall 106 between a closed position in which it covers the slot 110 and an open position in which it permits the actuator plate 112 to move to its second position (e.g., FIG. 6).

Advantageously, the cover 126 prevents the flow of debris (e.g., broken wafers, shards, particulate contaminants, etc.) into the slot 110 when the slit valve 100 is open.

Figure 8:
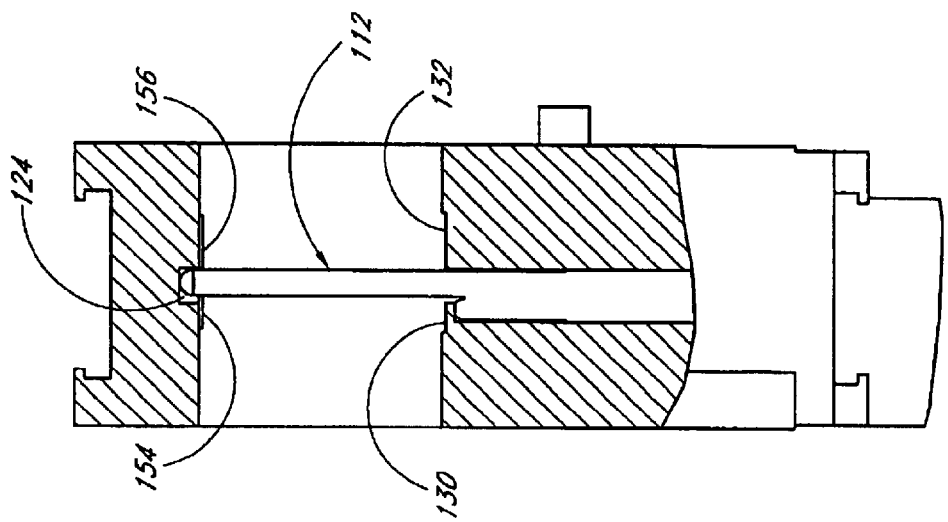
FIG. 8 is a schematic side view of the slit valve of FIG. 7, shown in a closed position.
Figure 7:
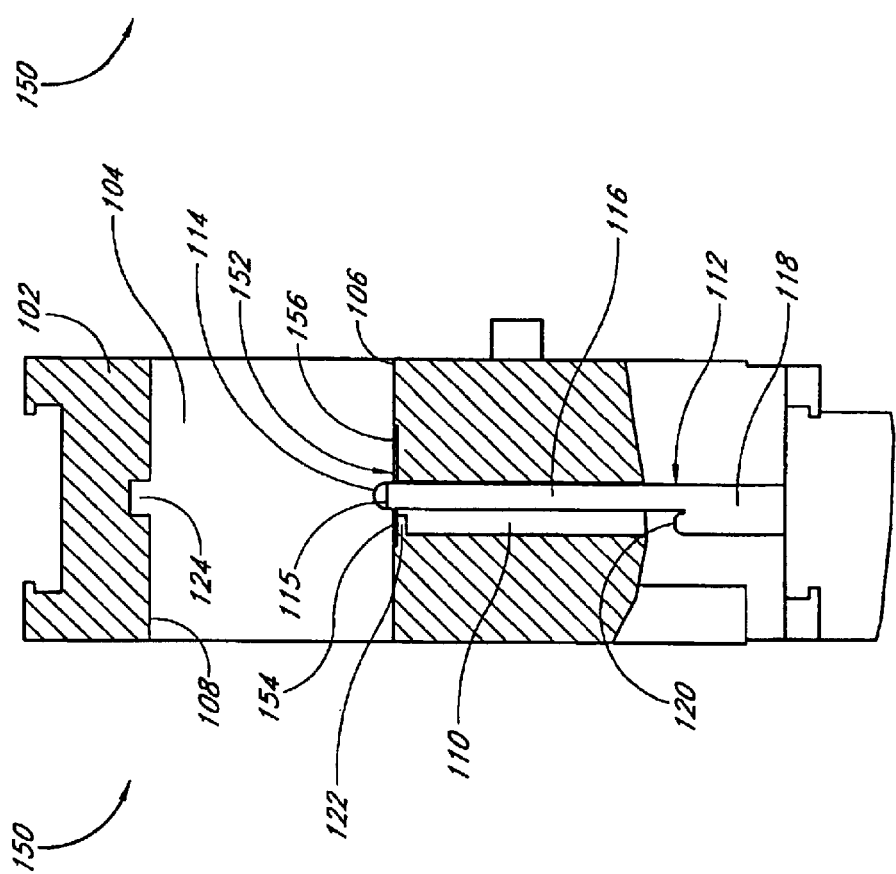
FIG. 7 is a schematic side view of another embodiment of a slit valve according to the present invention; shown in an open position.

FIGS. 7 and 8 illustrate a slit valve 150 configured in accordance with an alternative embodiment of the present invention. The configuration of the valve 150 is substantially similar to that of the valve 100 shown in FIGS. 5 and 6, except as indicated herein. Like reference numerals are used to indicate similar elements of the valves 100 and 150.

With reference to FIGS. 7 and 8, the illustrated valve 150 comprises a valve housing 102 configured to fit within the main body of a reactor housing, so that a passage 104 of the housing 102 is aligned with or forms a portion or the entirety of a wafer transfer port. The valve 150 includes an actuator plate 112 received within and configured to translate within a slot 110 of the first wall 106 of the passage 104. The actuator plate 112 is configured substantially similarly to that of the above-described valve 100. The actuator plate 112 has a first position (in the illustrated embodiment a lowered position), shown in FIG. 7, in which the plate 112 permits the transfer of a substrate through the passage 104 across the valve 150. This corresponds to an open position of the valve 150. The actuator plate 112 also has a second position (in the illustrated embodiment a raised position), shown in FIG. 8, in which the plate 112 blocks the passage, and preferably prevents the flow of fluid through the passage across the valve 150. This corresponds to a closed position of the valve 150.

The primary difference between the valve 150 shown in FIGS. 7 and 8 and the valve 100 shown in FIGS. 5 and 6 is that the valve 150 includes a different type of protective cover. In particular, instead of a cover pivotably secured to the first wall 106 as in the case of the valve 100, the valve 150 includes a cover 152 secured to the actuator plate 112, proximate an end of the plate 112. The cover 152 is configured to substantially prevent debris within the passage 104 from entering the slot 110 when the actuator plate 112 occupies its first position. Preferably, when the actuator plate 112 is in its first position, the cover 152 completely covers the slot 110, as shown in FIG. 7. In one embodiment, as shown in FIG. 7, when the actuator plate 112 is in its first position, an edge of the plate 112 remains within the passage 104.

In the illustrated embodiment, the cover 152 comprises a first plate element 154 attached to a first surface or side of the actuator plate 112, and a second plate element 156 attached to an opposing second surface or side of the plate 112. The plate elements 154 and 156 can be attached to the plate 112 by any of a variety of suitable means, giving due consideration to the goal of a durable, long-lasting attachment that can withstand the high temperatures (e.g., 600° C. or higher) associated with semiconductor processing. In one embodiment, the plate elements 154 and 156 are adhesively bonded to the actuator plate 112, via epoxy or the like. Preferably, the plate elements 154 and 156 are generally coplanar. The skilled artisan will understand that the elements 154 and 156 can alternatively have non-plate configurations. The skilled artisan will also appreciate that the cover 152 can have a variety of different forms. For example, it can comprise a single plate (as opposed to two plate elements 154 and 156). In this configuration, the portion of the actuator plate 112 that fits into the groove 124 of the second wall 108 can be separate from the remaining portion of the plate 112 and affixed onto the single plate cover 152. In yet another configuration, the actuator plate 112 and the cover 152 are formed together as a single piece. Many other configurations are also possible.

In the illustrated embodiment of FIGS. 7 and 8, the plate elements 154 and 156 are preferably oriented substantially parallel to the first wall 106 of the passage 104. The first wall 106 preferably includes a recess configured to receive the cover 152 when the actuator plate 112 occupies its first position. In the illustrated embodiment, this recess comprises a first recess portion 130 configured to receive the first plate element 154, and a second recess portion 132 configured to receive the second plate element 156. The recess portions 130 and 132 are preferably configured such that surfaces of the plate elements 154 and 156 (in FIGS. 7 and 8, the upper surfaces of the plate elements) are substantially coplanar with the first wall 106 when the actuator plate 112 occupies its first position (e.g., FIG. 7). In addition, the groove 124 in the second wall 108 of the passage 104 is preferably sized and configured such that when the actuator plate 112 occupies its second position, surfaces of the plate elements 154 and 156 are substantially coplanar with the second wall 108, as shown in FIG. 8.

Like the cover 126 shown in FIGS. 5 and 6, the cover 152 prevents the flow of debris into the slot 110 when the slit valve 150 is open.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above. Thus, it is intended that the scope of the present invention herein disclosed should not be limited by the particular disclosed embodiments described above, but should be determined only by a fair reading of the claims that follow.

We claim:

1. A slit valve, comprising:
   a passage sized and adapted for transfer of a semiconductor substrate through the passage, the passage having first and second walls generally opposing one another, the first wall having a slot oriented generally transverse to the passage;
   an actuator plate received within the slot, the actuator plate configured to translate within the slot, the actuator plate having a first position in which the actuator plate permits transfer of a substrate through the passage, the actuator plate also having a second position in which the actuator plate blocks the passage; and
   a protective cover configured to substantially prevent debris within the passage from entering the slot when the actuator plate occupies its first position;
   wherein the cover is hingedly secured to the first wall of the passage.

2. The slit valve of claim 1, wherein the cover has a closed position in which the cover completely covers the slot, and an open position in which the cover does not obstruct movement of the actuator plate from its first position to its second position, the cover being biased toward its closed position.

3. The slit valve of claim 1, wherein the actuator plate in its second position blocks fluid flow through the passage across the actuator plate.

4. The slit valve of claim 1, wherein the passage is formed within a valve housing, said valve housing configured to be positioned within a semiconductor reactor.

5. The slit valve of claim 1, wherein the cover comprises a plate.

6. The slit valve of claim 1, wherein the first wall of the passage is generally horizontal, the slot and the actuator plate being generally vertical.

7. The slit valve of claim 1, wherein the slot and actuator plate are oriented generally perpendicular to the first wall of the passage.

8. The slit valve of claim 1, wherein the slot and actuator plate are oriented generally perpendicular to the second wall of the passage.

9. The slit valve of claim 1, wherein the slot and actuator plate are oriented generally perpendicular to the passage.

10. The slit valve of claim 1, wherein the cover covers the slot when the actuator plate occupies its first position.

11. The slit valve of claim 1, wherein the actuator plate has a sealing edge that bears against at least the second wall of the passage when the actuator plate occupies its second position, the sealing edge preventing fluid flow though the passage across the actuator plate when the actuator plate occupies its second position.

12. The slit valve of claim 11, wherein a sealing material is attached to the sealing edge.

13. The slit valve of claim 12, wherein the sealing material comprises VITON.

14. The slit valve of claim 11, wherein when the actuator plate occupies its first position, the sealing edge of the actuator plate is outside of the passage.

15. The slit valve of claim 11, wherein the second wall of the passage includes a groove configured to receive the sealing edge of the actuator plate when the actuator plate occupies its second position.

16. The slit valve of claim 1, wherein the first wall of the passage includes a recess configured to receive the cover in its closed position.

17. The slit valve of claim 16, wherein a surface of the cover in its closed position is substantially coplanar with the first wall.

18. The slit valve of claim 1, wherein the cover is configured such that movement of the actuator plate from its first position to its second position causes the cover to move to an open position of the cover, and such that movement of the actuator plate from its second position to its first position causes the cover to cover the slot.

19. The slit valve of claim 1, wherein the cover comprises a plate.

20. The slit valve of claim 1, wherein the slot defines an elongated opening in the first wall.

21. A semiconductor processing apparatus including a slit valve, the slit valve comprising:
   a passage having first and second walls generally opposing one another, the first wall having a slot;
   an actuator plate received within the slot, the actuator plate configured to translate within the slot, the actuator plate having a first position in which the actuator plate permits transfer of a substrate through the passage, the actuator plate also having a second position in which the actuator plate blocks the passage, the actuator plate including a generally planar portion configured to pass through the slot; and
   a plate hingedly mounted to the first wall and configured to selectively cover the slot when the actuator plate occupies its first position.

22. The slit valve of claim 1, wherein a generally planar portion of the actuator plate extends through the slot when the actuator plate is in the second position.

23. The slit valve of claim 21, wherein the actuator plate includes a generally planar portion extending through the slot when the actuator plate is in the second position.

24. The slit valve of claim 21, wherein the second wall has a groove configured to receive an upper end of the actuator plate when the plate is in the second position.

25. The semiconductor processing apparatus of claim 21, wherein the actuator plate in its second position blocks fluid flow through the passage across the actuator plate.

26. An apparatus for processing a semiconductor substrate, comprising:
   a first chamber;
   a second chamber;
   a passage connecting the first and second chambers, the passage sized and adapted to permit transfer of a substrate between the first and second chambers, the passage having first and second walls generally opposing one another, the first wall having a slot;
   an actuator plate received within the slot, the actuator plate configured to translate within the slot, the actuator plate having a first position in which the actuator plate permits transfer of a substrate from the first chamber through the passage into the second chamber, the actuator plate also having a second position in which the actuator plate blocks the passage; and
   a protective cover hingedly secured to the first wall of the passage proximate the slot, the cover having a closed position in which the cover substantially prevents debris within the passage from entering the slot, the cover being permitted to occupy its closed position when the actuator plate occupies its first position, the cover having an open position which the cover occupies when the actuator plate occupies its second position.

27. The apparatus of claim 26, wherein the actuator plate in its second position blocks fluid flow through the passage across the actuator plate.

28. The apparatus of claim 26, wherein the first wall of the passage is generally horizontal, the slot and the actuator plate being generally vertical.

29. The apparatus of claim 26, wherein the slot and actuator plate are oriented generally perpendicular to the first wall of the passage.

30. The apparatus of claim 26, wherein the slot and actuator plate are oriented generally perpendicular to the second wall of the passage.

31. The apparatus of claim 26, wherein the slot and actuator plate are oriented generally perpendicular to the passage.

32. The apparatus of claim 26, wherein the cover in its closed position completely covers the slot.

33. The apparatus of claim 32, wherein the cover is able to occupy its closed only when the actuator plate occupies its first position.

34. The apparatus of claim 26, wherein the actuator plate has a sealing edge that bears against at least the second wall of the passage when the actuator plate occupies its second position, the sealing edge fluidly sealing the first chamber from the second chamber when the actuator plate occupies its second position.

35. The apparatus of claim 34, wherein a sealing material is attached to the sealing edge.

36. The apparatus of claim 35, wherein the sealing material comprises VITON.

37. The apparatus of claim 34, wherein when the actuator plate occupies its first position, the sealing edge of the actuator plate is outside of the passage.

38. The apparatus of claim 37, wherein when the cover occupies its closed position, the cover completely covers the slot.

39. The apparatus of claim 34, wherein the second wall of the passage includes a groove configured to receive the sealing edge of the actuator plate when the actuator plate occupies its second position.

40. The apparatus of claim 26, wherein the cover is biased toward its closed position.

41. The apparatus of claim 26, wherein the first wall of the passage includes a recess configured to receive the cover in its closed position.

42. The apparatus of claim 41, wherein a surface of the cover in its closed position is substantially coplanar with the first wall.

43. The apparatus of claim 26, wherein the cover is configured such that movement of the actuator plate from its first position to its second position causes the cover to move to its open position.

44. The apparatus of claim 26, wherein the cover comprises a plate.

45. An apparatus for processing a semiconductor substrate, comprising:
   a chamber configured to enclose a semiconductor substrate;
   a region outside the chamber;
   a passage connecting the chamber and said region, the passage having an elongated portion with a generally uniform cross-section sized and configured for transferring a substrate through said portion of the passage between the chamber and said region, said portion of the passage having first and second walls generally opposing one another, the first wall having a slot oriented generally transverse to said portion of the passage;
   an actuator plate received within and translatable within the slot in the first wall, the actuator plate having a first position in which the actuator plate permits transfer of a substrate from said region through said portion of the passage into the chamber, the actuator plate also having a second position in which the actuator plate blocks said portion of the passage, said actuator elate being configured to extend substantially throughout and substantially completely block said portion of the passage; and
   a protective cover hingedly secured to the first wall and configured to substantially prevent debris within the passage from entering the slot when the actuator plate occupies its first position.

46. The apparatus of claim 45, wherein the actuator plate in its second position prevents fluid flow through said portion of the passage between said region and the chamber.

47. The apparatus of claim 45, wherein the first wall has a recess configured to receive the cover when the actuator plate occupies its first position.

48. The apparatus of claim 47, wherein the recess is sized so that a surface of the cover is substantially coplanar with the first wall when the actuator plate occupies its first position.

49. The apparatus of claim 45, wherein the first wall including recess configured to receive the plate element.

50. The apparatus of claim 49, wherein the recess is sized so that a surface of the plate element is substantially coplanar with the first wall when the actuator plate occupies its first position.

51. The apparatus of claim 45, wherein the second wall includes a groove configured to receive an end of the actuator plate in its second position.

52. A semiconductor processing apparatus including a slit valve, the slit valve comprising:

a passage having first and second walls generally opposing one another, the first wall having an elongated slot, a portion of the passage being defined and located between the slot and the second wall;

an actuator plate received within the elongated slot, the actuator plate having a generally planar portion configured to translate within the elongated slot, the actuator plate having a first position in which the actuator plate permits transfer of a substrate through the passage, the actuator plate also having a second position in which the actuator plate occupies and fills most of the cross sectional area of the portion of the passage and the planar portion extends through the slot; and an elongated plate hingedly coupled to the first wall and configured to selectively cover the elongated slot when the actuator plate occupies its first position.

53. A slit valve, comprising:

a passage sized and adapted for transfer of a semiconductor substrate through the passage, the passage having first and second walls generally opposing one another, the first wall having a slot oriented generally transverse to the passage, a portion of the passage being defined and interposed between the slot and the second wall;

an actuator plate received within the slot, the actuator plate configured to translate within the slot, the actuator plate having a first position in which the actuator plate permits transfer of a substrate through the passage, the actuator plate also having a second position in which the actuator plate substantially entirely blocks the portion of the passage; and a protective cover configured to substantially prevent debris within the passage from entering the slot when the actuator plate occupies its first position.

54. The slit valve of claim 53, wherein the cover has a closed position in which the cover completely covers the slot, and an open position in which the cover does not obstruct movement of the actuator plate from its first position to its second position, the cover being biased toward its closed position.

* * * * *